(12) United States Patent
Payne et al.

(10) Patent No.: US 10,697,372 B2
(45) Date of Patent: Jun. 30, 2020

(54) TURBINE ENGINE CONDUIT INTERFACE (71) Applicant: General Electric Company, Schenectady, NY (US)

(72) Inventors: Jeremy Kevin Payne, West Chester, OH (US); John Wilbur Acree, Loveland, OH (US); Anthony James Bailey, Rising Sun, IN (US); Satyambabu Kalyani, Bangalore (IN); Thomas Alan Wall, West Chester, OH (US); Michael Alan Zupancic, Liberty Township, OH (US); Jonathan Russell Ratzlaff, Loveland, OH (US); Anthony Paul Greenwood, Kings Mills, OH (US); Kevin William Caldwell, Maineville, OH (US); Christophe Jude Day, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 322 days.

(21) Appl. No.: 15/479,750

(22) Filed: Apr. 5, 2017

(65) Prior Publication Data
US 2018/0291812 A1 Oct. 11, 2018

(51) Int. Cl.
| | |
|---|---|
| F02C 7/00 | (2006.01) |
| F02C 7/20 | (2006.01) |
| F02C 3/04 | (2006.01) |
| F02C 7/18 | (2006.01) |
| F02C 6/08 | (2006.01) |

(52) U.S. Cl.
CPC ............. *F02C 7/20* (2013.01); *F02C 3/04* (2013.01); *F02C 6/08* (2013.01); *F02C 7/18* (2013.01); *F02C 7/185* (2013.01); *F05D 2230/60* (2013.01); *F05D 2240/55* (2013.01)

(58) Field of Classification Search
CPC .... F02C 7/20; F02C 7/18; F02C 7/185; F02C 3/04; F02C 6/08; F05D 2230/60; F05D 2240/55; F05D 2260/31; F05D 2260/36; F05D 2260/37; F01D 5/081; F01D 5/082
See application file for complete search history.

(56) References Cited

U.S. PATENT DOCUMENTS

| | | | |
|---|---|---|---|
| 3,004,494 A | 10/1961 | Corbett | |
| 4,645,415 A * | 2/1987 | Hovan | .................. F01D 25/125 415/115 |
| 4,805,397 A * | 2/1989 | Barbier | ..................... F23R 3/06 60/800 |
| 4,928,483 A | 5/1990 | LeFort et al. | |
| 5,251,985 A * | 10/1993 | Monzel | ..................... F16F 1/32 384/99 |

(Continued)

OTHER PUBLICATIONS

Aircrafty, How a Wing Produces Lift, Aug. 21, 2016 (Year: 2016).*

*Primary Examiner* — Todd E Manahan
*Assistant Examiner* — Edwin Kang
(74) *Attorney, Agent, or Firm* — Hanley, Flight and Zimmerman, LLC (57) ABSTRACT An apparatus and method for a turbine engine having an engine core. A casing can contain a compressor section, a combustor section and a turbine section in axial flow arrangement. An air conduit can extend at least partially between the compressor section and the turbine section. A compliant interface can include a nut and a biasing device mount the air conduit to the casing.

14 Claims, 8 Drawing Sheets (56) References Cited

U.S. PATENT DOCUMENTS

| | | |
|---|---|---|
| 5,562,116 A | 10/1996 | Henwood |
| 7,195,447 B2 | 3/2007 | Moniz et al. |
| 8,408,868 B2 | 4/2013 | Hatman |
| 8,529,195 B2 | 9/2013 | Widener |
| 9,435,206 B2 | 9/2016 | Johnson et al. |
| 2003/0118399 A1* | 6/2003 | Schilling ............... F16B 5/0275 403/337 |
| 2005/0253379 A1* | 11/2005 | Ress, Jr. ................. F01D 11/00 285/92 |
| 2006/0123797 A1* | 6/2006 | Zborovsky .............. F01D 9/041 60/800 |
| 2011/0088405 A1* | 4/2011 | Turco ...................... F01D 5/081 60/782 |
| 2012/0087784 A1* | 4/2012 | Widener ................. F01D 5/085 415/180 |
| 2016/0186997 A1* | 6/2016 | Sadil ........................ F02C 7/24 60/772 |

\* cited by examiner

TURBINE ENGINE CONDUIT INTERFACE

BACKGROUND OF THE INVENTION

Turbine engines such as gas or combustion turbine engines are rotary engines that extract energy from a flow of combusted gases passing through the engine onto a multitude of rotating turbine blades.

Gas turbine engines utilize a mainstream flow to drive the rotating turbine blades to generate thrust. The mainstream flow is propelled by combustion of gas to increase the thrust generated by the engine. The combustion of gas generates excessive temperatures within the engine turbine, requiring cooling of certain components. Such cooling can be accomplished through providing air from the mainstream flow bypassing the combustor having a lower temperature, unheated by the gas combustion.

Air bypassing the combustor moves in a substantially axial flow. In order to minimize losses from the substantially axial flow provided to rotating rotor elements, an inducer can turn the axial, bypass flow to have a swirling, tangential component. An inlet providing the bypassing air to the inducer can be rigid and susceptible to damage due to low cycle fatigue.

BRIEF DESCRIPTION OF THE INVENTION

In one aspect, the present disclosure relates to a turbine engine having an engine core with a casing containing a compressor section, combustor section, and a turbine section in axial flow arrangement. A bypass air conduit at least partially extends between the compressor section and the turbine section. A compliant interface includes a nut securing the bypass air conduit to the casing and includes a coned washer disposed between the nut and the casing.

In another aspect, the present disclosure relates to a bypass air circuit fluidly coupling a compressor section to a turbine section and bypassing a combustor section of a turbine engine having a casing. The bypass air circuit includes a bypass air conduit that at least partially forms the bypass air circuit and extends between the compressor section and the turbine section. The bypass air circuit further includes a compliant interface including a nut securing the bypass air conduit to the casing and includes a coned washer disposed between the nut and the casing.

In yet another aspect, the present disclosure relates to a method of forming a compliant connection between a bypass air conduit and a casing of a turbine engine. The method includes fastening a portion of the bypass air conduit to the casing with a biasing device to form a preload between the bypass air conduit and the casing.

DETAILED DESCRIPTION OF THE INVENTION

Aspects of the disclosure described herein are directed to a compliant interface. For purposes of illustration, the present disclosure will be described with respect to an inlet assembly for an inducer assembly extending between a compressor section and a turbine section of an engine. It will be understood, however, that aspects of the disclosure described herein are not so limited and may have general applicability within an engine, including coupling other bypass air conduits, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
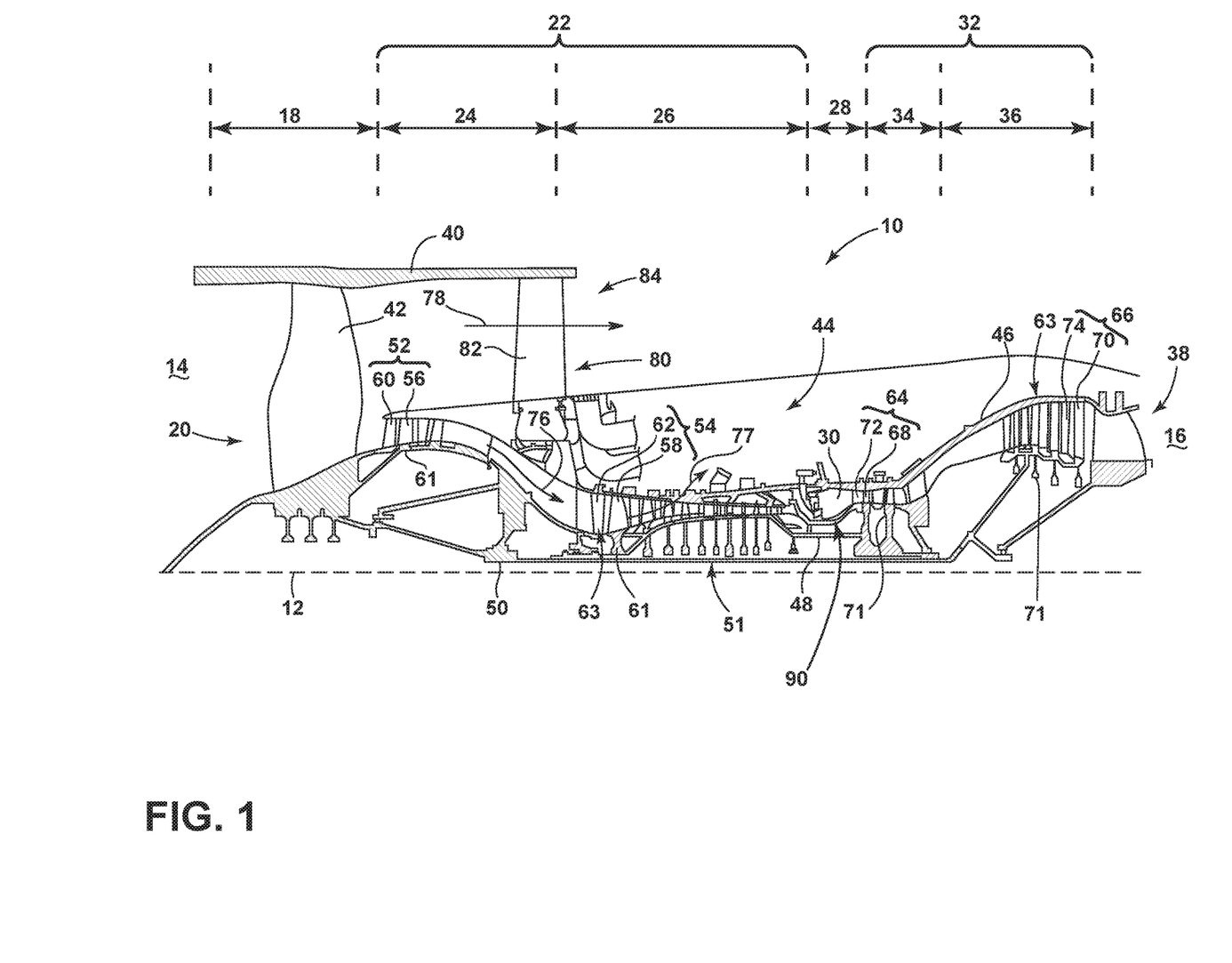
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

An inducer assembly 90 is positioned within the combustion section 28 and radially within the combustor 30 relative to the engine centerline 12. The inducer assembly 90 fluidly couples the compressor section 22 to the turbine section 32, bypassing the combustor 30. As such, the inducer assembly 90 can provide a flow of air to the turbine section 32 at a temperature much lower than that of the combusted gases provided from the combustor 30. Additionally, the inducer assembly 90 can induce a rotation on the flow of air bypassing the combustor 30, in order to provide a rotating airflow to the turbine section 32 as opposed to an axial flow. The rotating airflow minimizes losses resultant from integrating the bypass flow into the rotating mainstream airflow 76.

Figure 2:
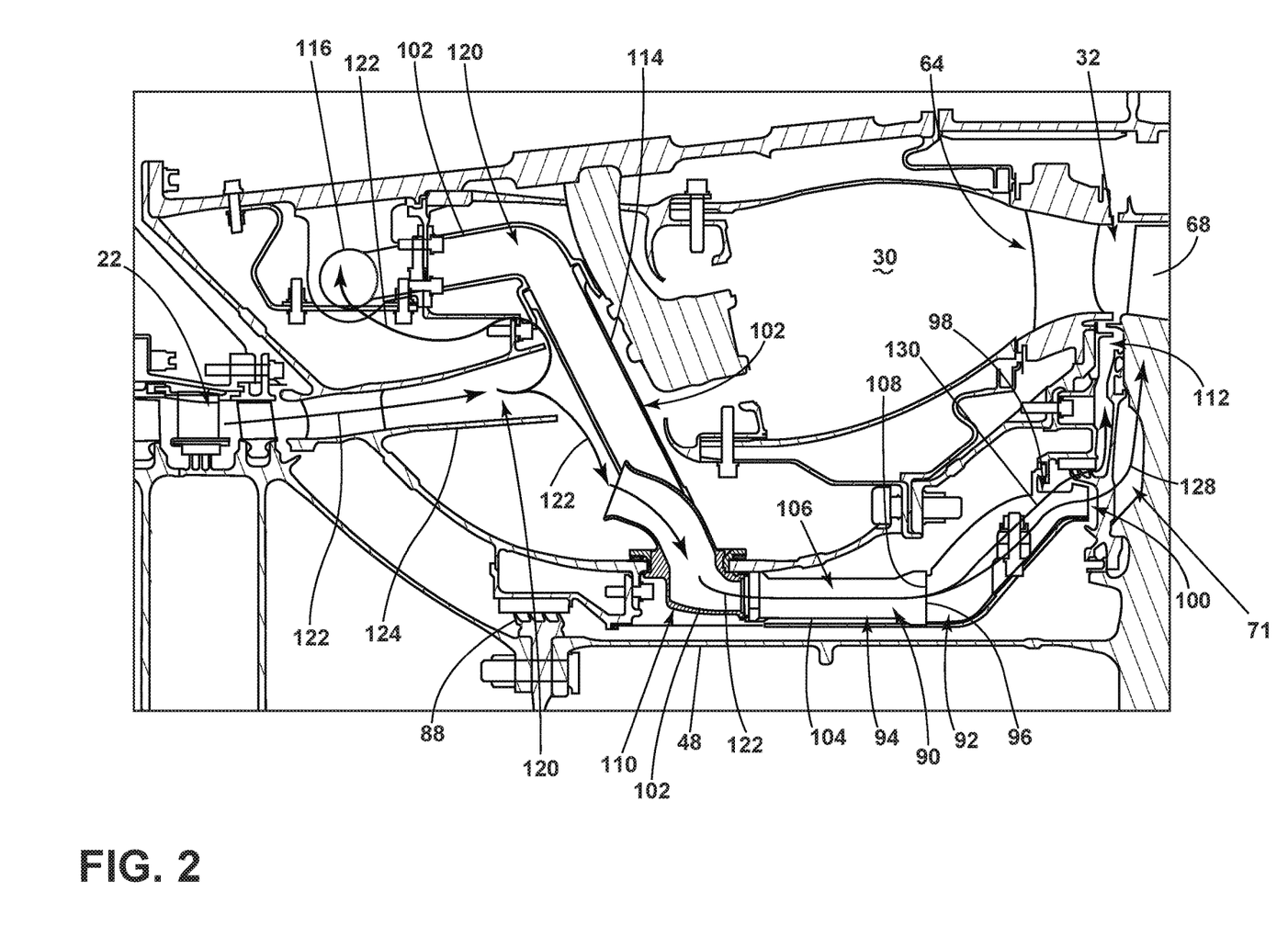
FIG. 2 is an enlarged, section view of an inducer assembly bypassing a combustion section of the engine of FIG. 1.

Referring now to FIG. 2, the inducer assembly 90 can mount radially around the HP spool 48, having at least one seal 88 disposed between the static assembly coupled to the inducer assembly 90 and the rotating HP spool 48. An inducer 92 and an inducer conduit 94 coupled to the inducer 92 can at least partially form the inducer assembly 90. The inducer conduit 94 includes a body 104 defining an interior 106, and an outlet 108. The outlet 108 of the inducer conduit 94 couples to the inlet of the inducer 92. An inlet 96 of the inducer 92 couples to the inducer conduit 94. The inducer assembly 90 exhausts at a first outlet 98 and a second outlet 100.

An inducer assembly 110 can be fed with an airflow 122 directly from the compressor section 22 at an outlet guide vane 124. Alternatively, the inducer assembly 110 can be fed with the airflow from the compressor section 22 at the outlet guide vane 124 via a bypass air conduit 114 having a bypass air inlet 116. The airflow path from the compressor section 22 to the inducer assembly 110, whether directly from the outlet guide vane 124, or via the bypass air conduit 114, can form a bypass air circuit 120. The airflow 122 can be cool relative to the temperature of the combusted air from the combustor 30. As such, the airflow 122 may not be cool or cold, but lower in temperature relative to the temperature of the combusted air from the combustor 30. The airflow 122 is provided to the inducer assembly 90 through the an air conduit 102, where the inducer assembly 90 can direct the airflow 122 to portions of the engine requiring the cooler temperature of air.

From the inducer assembly 90, the cooling air circuit 120 can exhaust through a first cooling flow path 128 at the second outlet 100 or a second cooling flow path 130 at the first outlet 98. The first outlet 98 fluidly couples to a buffer cavity 112 in the first stage 64 from the turning flow path 130 and the second outlet 100 couples to the cavity adjacent the stage-one disk 71 of the HP turbine first stage 64 from the cooling flow path 128, fluidly coupling to the HP turbine first stage blade 68.

Figure 3:
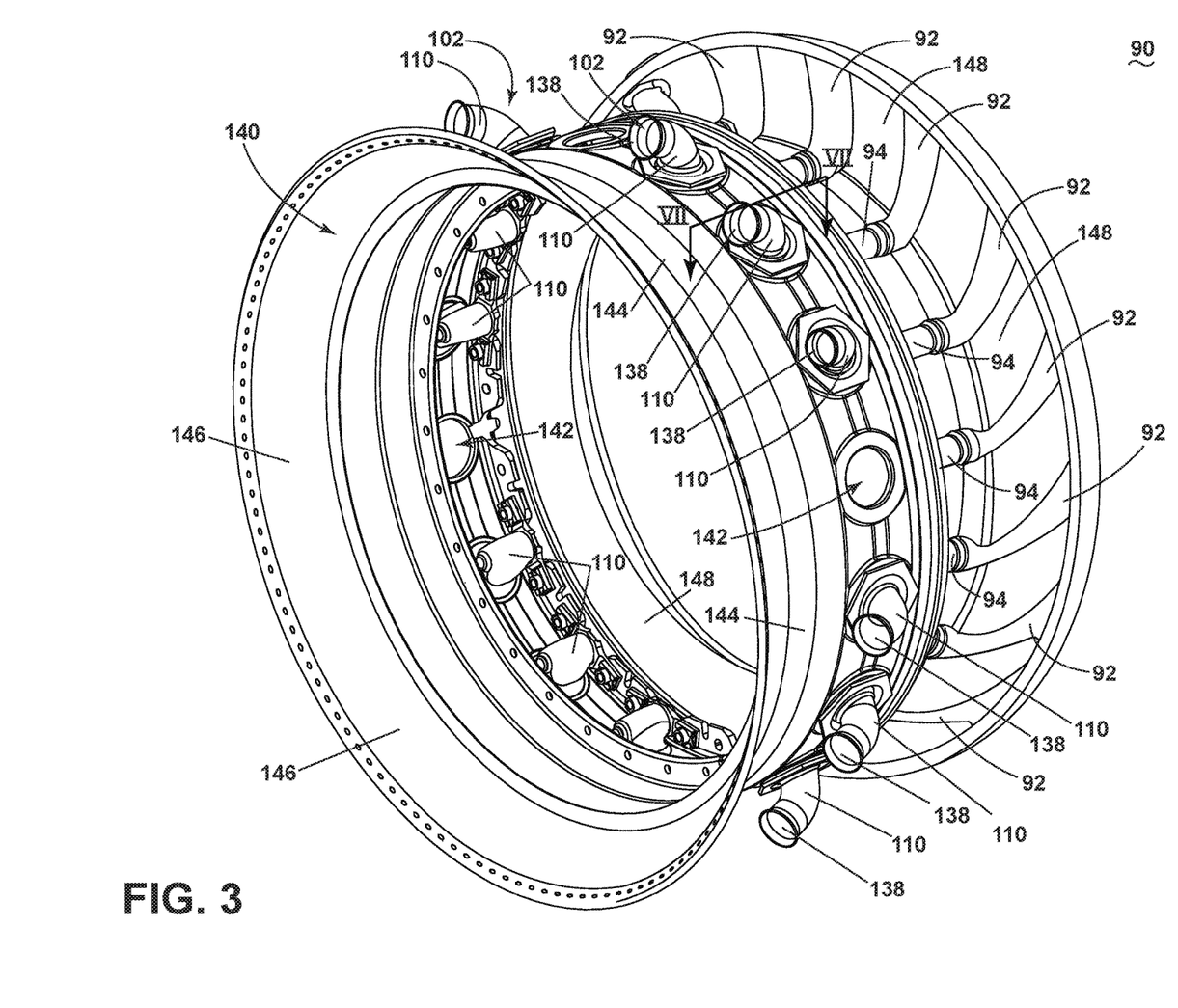
FIG. 3 is a perspective view of the inducer assembly of FIG. 2 including a set of inlets.

Referring now to FIG. 3, a set of inducers 92 couple to complementary inducer conduits 94 in circumferential arrangement. A set as described herein can include any number of the described element, including one. As such, the set of inducers 92 can be one or more inducers 92. An inlet assembly 110 can at least partially form the bypass air conduit 102 for the inducer assembly 90, which can be arranged as a set of inlet assemblies 110 having ends 138 arranged circumferentially about the inducer assembly 90 and coupled to the inducers 92 through the inducer conduits 94. It should be understood that the bypass air conduits 102 are illustrated and described with respect to the inlet assemblies 110 for the inducer assembly 90 by way of example only, and that the bypass air conduits 102 should not be so limited. In one alternative, non-limiting example, the bypass air conduits 102 can include elongated conduits fluidly coupled to a bypass air supply provided from the compressor section to the inducer assembly 90 or the turbine section, or any other similar conduit within the engine. As such, the end 138 can be formed as terminal end of an elongated conduit. In another alternative, example, the bypass air conduits 102 can be similar fluid conduits extending through the engine, such as air conduits or oil conduits.

A casing 140 can at least partially define the inducer assembly 90 and includes an opening 142 providing for mounting of the inlet assemblies 110. A first side 144 of the casing can be provided on the radial exterior of the casing 140 and a second side 146 can be provided on the radial interior of the casing 140, opposite the first side 144. The inlet assemblies 110 can pass through the openings 142 to fluidly couple to the inducers 92. A cover 148 can couple to the inducer assembly 90, such as at the casing 140. The cover 148 can be provided radially interior of the inducers 92 while the casing 140 is positioned radially exterior. The cover 148 can extend toward the outlets 100 (FIG. 2) of the inducers 92 in an arcuate manner, and can affix to the inducers at the outlets 100.

Figure 4:
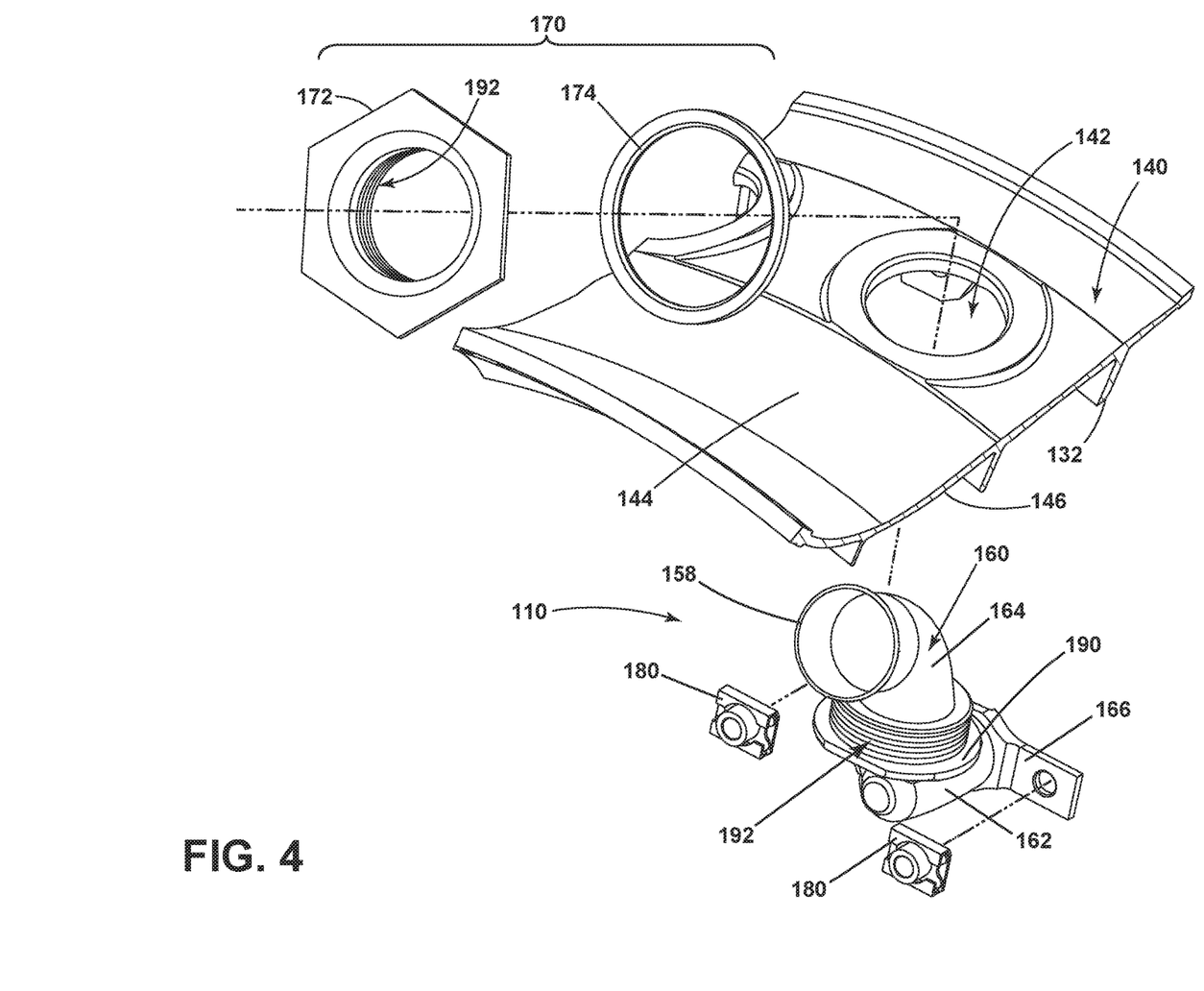
FIG. 4 is an exploded view illustrating the assembly of the inlet and the compliant interface of FIG. 5.

FIG. 4 illustrates the inlet assembly 110 exploded from a portion of the casing 140. The inlet assembly 110 includes a body 160 with an inlet 158. A neck 164 extends from the inlet 158 to an elbow 162. A shoulder 190 is formed on the exterior of the body 160 at the elbow 162. A threaded connection 192 can be positioned at the shoulder 190. A plate 166 is provided on the body 160 opposite of the inlet 158. Two supports 180 can be adapted to receive a bolt or similar fastener (not shown) to affix the inlet assembly 110 to the casing 140 at a lip 132 extending from the second side 146 of the casing 140. While the plate 166 is shown as adapted to receive two supports 180, any number of supports is contemplated. A compliant interface 170 can include a nut 172 and a coned washer 174. The coned washer 174 can be angled to form a hollow, truncated cone. In one non-limiting example, the nut 172 can be a spanner nut.

During assembly, the inlet 158 and neck 164 of the inlet assembly 110 can insert through the opening 142 of the casing 140 until the shoulder 190 abuts the second surface 146 of the casing 140. The supports 180 can be used in concert with a fastener (not shown) to fix the inlet assembly 110 to the casing 140 at the lip 132. After fixing the inlet assembly 110, the coned washer 174 can be provided over the inlet 158, down the neck 164, to rest upon the first surface 144 of the casing 140. The nut 172 can be provided over the inlet 158, down the neck 164, and threadably couple at the threaded connection 192 on the neck 164 above the shoulder 190. The nut 172 can be tightened until it abuts the shoulder 190 through the opening 142.

Figure 5:
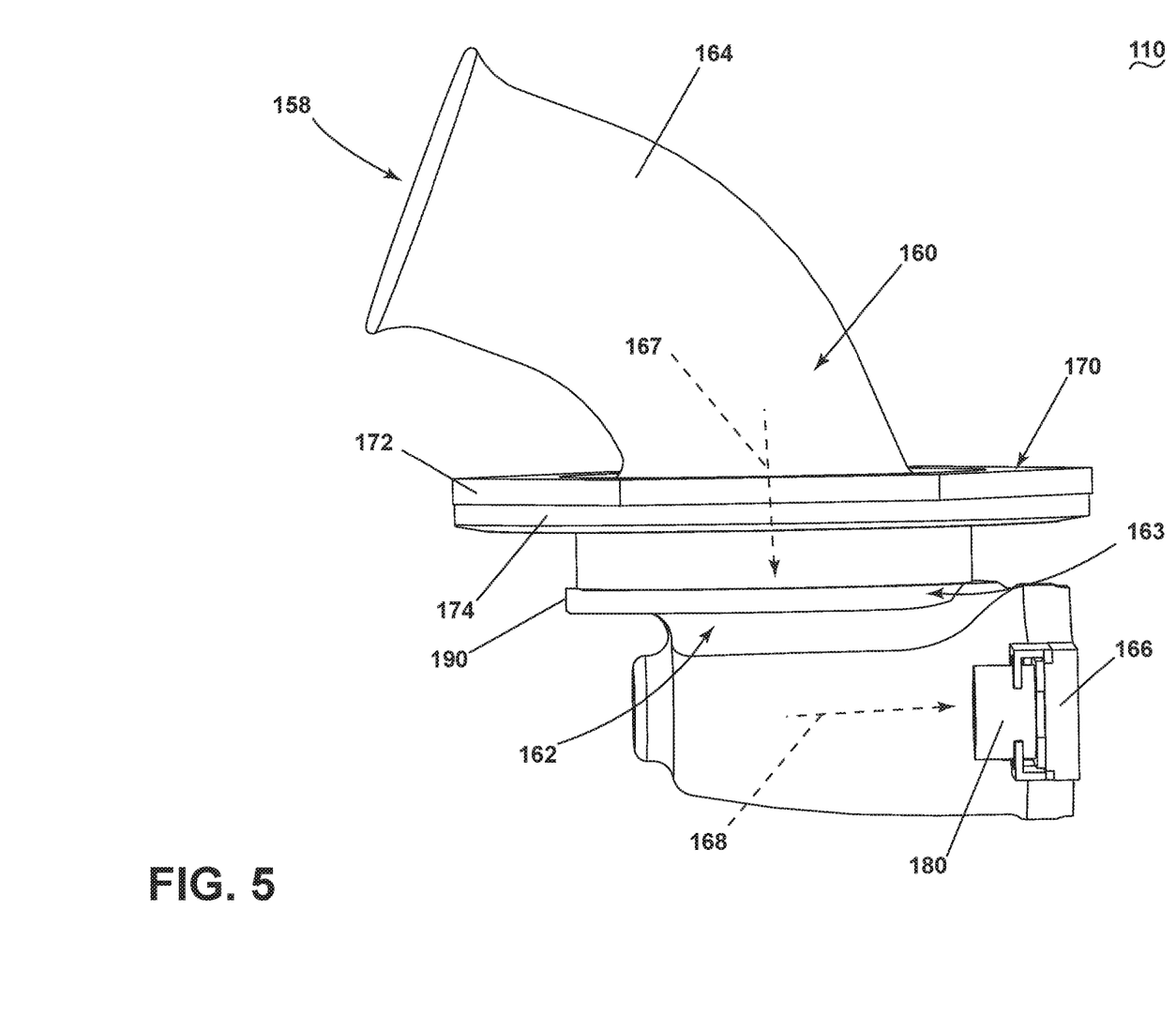
FIG. 5 is a side view of one inlet of the set of inlets of FIG. 3 having a compliant interface.

FIG. 5 illustrates a side view of the inlet assembly 110 coupled to the compliant interface 170 at the shoulder 190. The complaint interface 170 can seat at and rest upon the shoulder 190. The elbow 162 can form a turn 163 to transition from defining a substantially radial flow path 167 to a substantially axial flow path 168 through the neck 164.

Figure 6:
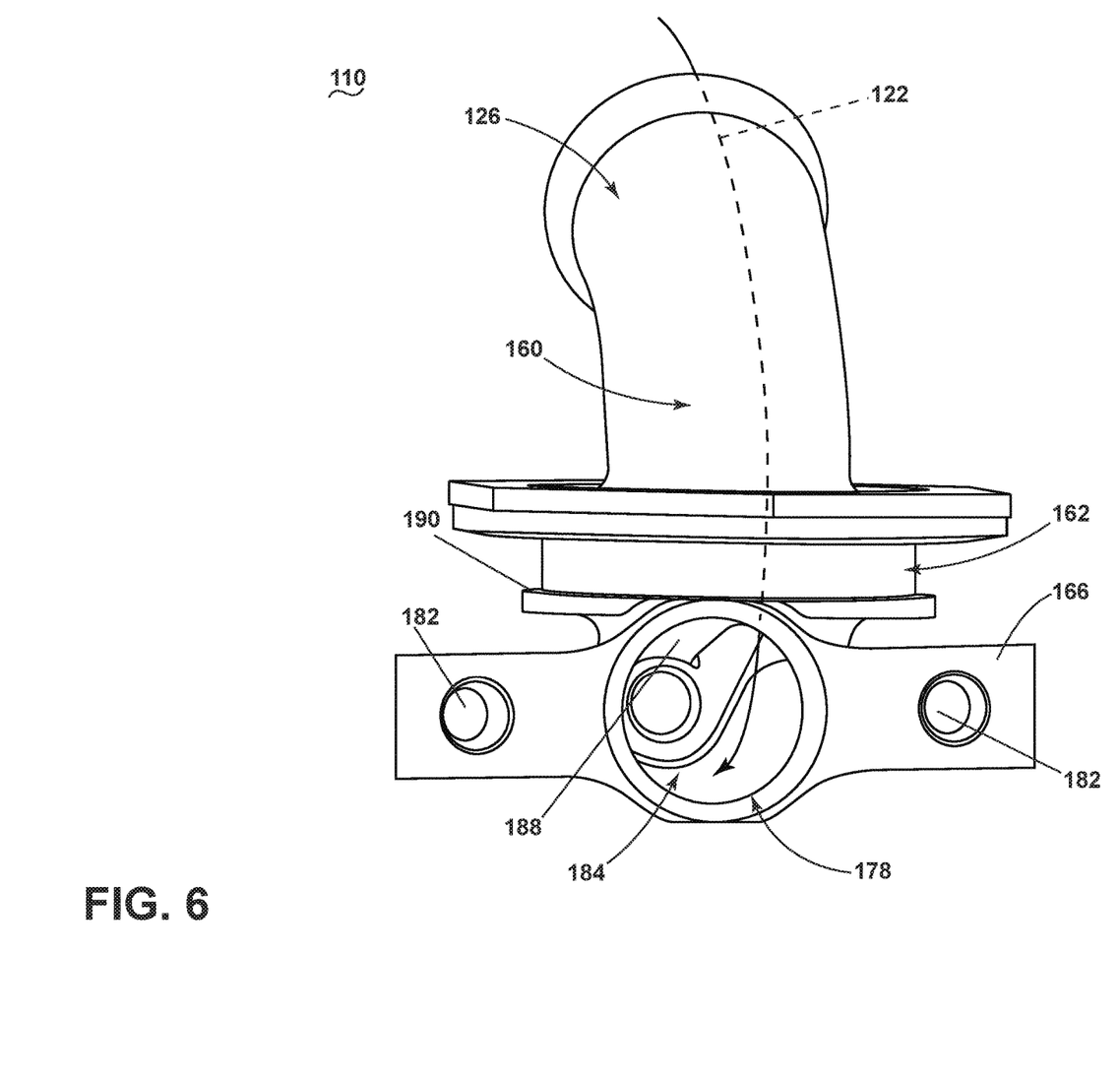
FIG. 6 is rear view of the inlet of FIG. 5 illustrating mounting apertures and an interior rib.

FIG. 6 shows a rear view of the inlet assembly 110. An outlet 178 is provided in the plate 166 with two apertures 182 on either sides of the outlet 178. An interior 184 is defined within the body 160 and at least partially defines the cooling circuit 120 (FIG. 2) through the inlet assembly 110. A rib 188 is formed in the body 160 and within the interior 184 at the elbow 162. The rib 188 extends partially through the interior 184 and can direct the bypass airflow path 126 toward one side of the inlet assembly 110 to induce a vortical flow on the airflow 122 passing through the interior 184. It should be appreciated that the interior 184 need not include the rib 188, such that the airflow 122 moving through the interior 184 is substantially laminar.

Figure 7:
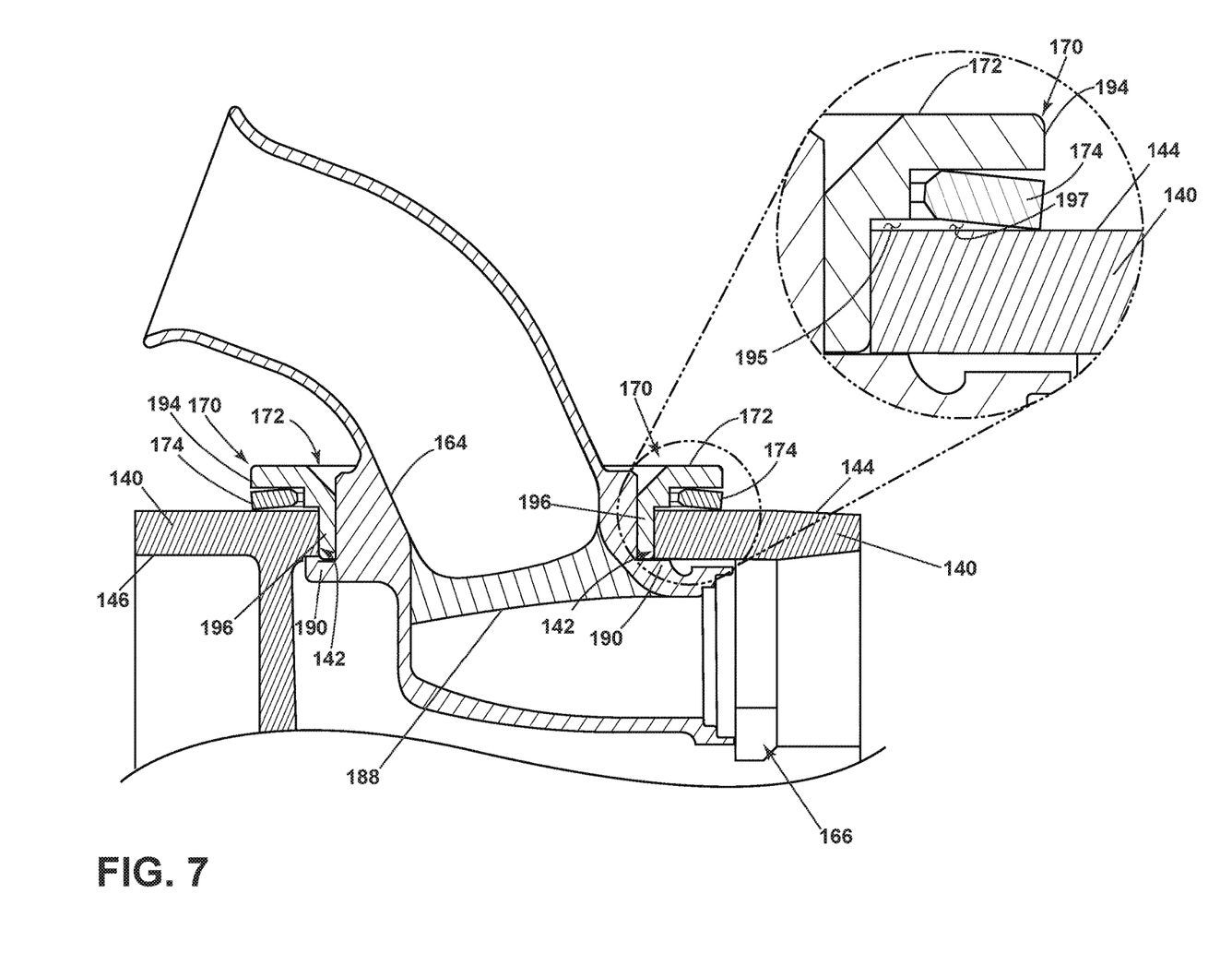
FIG. 7 is a cross-sectional view of one inlet mounted to a casing taken across section VII-VII of FIG. 3 having an enlarged area illustrating gaps between the compliant interface and the inducer assembly.

FIG. 7 is a cross-sectional view of the inlet assembly 110 coupled to the casing 140 taken along section VII-VII of FIG. 3. The stacked assembly of the compliant interface 170 to couple the inlet assembly 110 to the casing 140, from radially-outward to radially-inward, or top-to-bottom as shown, includes the nut 172, the coned washer 174, the casing 140, and the shoulder 190. A flange 194 of the nut 172 overlies the first side 144 of the casing 140 and the coned washer 174. The coned washer 174 is sandwiched between the nut 172 at the flange 194 and the first side 144. A collar of the nut 172 extends through the opening 142 in the casing 140 and abuts the shoulder 190. The nut 172, in one non-limiting example, can couple to the neck 164 of the inlet assembly 110 at the collar 196 with a threaded connection. The compliant interface 170 secures the inlet assembly 110 to the casing 140 at the opening 142. The flange 194, in combination with the coned washer 174, secures at the first surface 144 of the casing 140, while the shoulder 190 secures at the second surface 146 of the casing 140.

The coned washer 174 operates as a biasing device. The coned washer 174 can space the flange 194 of the nut 172 from the first surface 144 of the casing 140 by a first space 195, while the coned shape of the coned washer 174 can define a second space 197 between the first surface 144 and a portion of the coned washer 174. The first and second spaces 195, 197 provide for flexion of the compliant interface 170 as during movement or thermal growth during engine operation.

Figure 8:
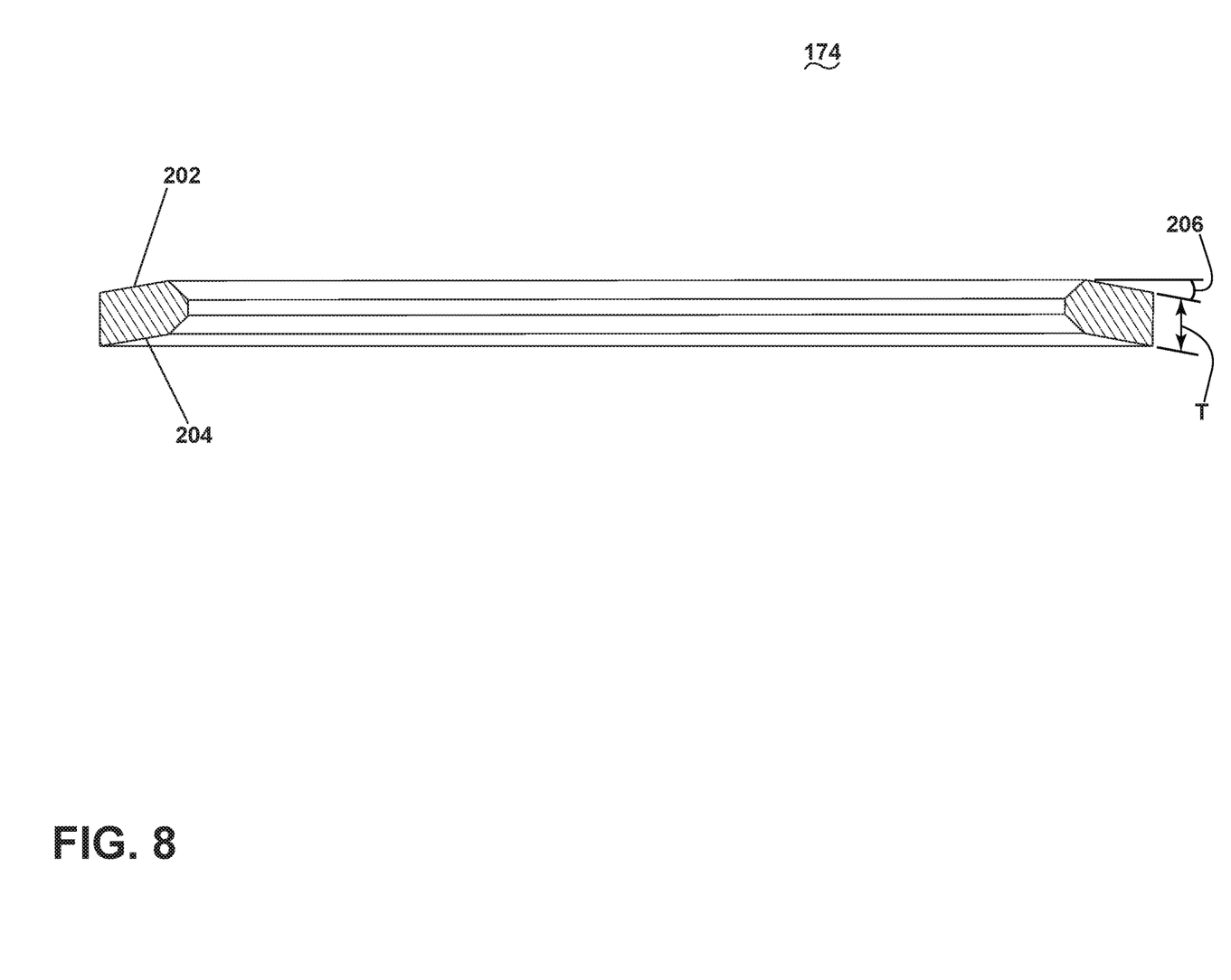
FIG. 8 is a section view of a biasing device isolated from the compliant interface of FIG. 7.

Referring now to FIG. 8, an isolated sectional view of the coned washer 174 illustrates an upper surface 202 separated from a lower surface 204 to define a thickness T. The upper and lower surfaces 202, 204 are provided at an angle 206. The angle 206, when utilized in the example shown, can be between 7.5 degrees and 16 degrees, and can be 11.5 degrees in one non-limiting example. However, it should be appreciated that the coned washer can be utilized with additional attachment assemblies, where a greater range of angles is contemplated in order to vary the particular amount of biasing force for the particular implementation. As such, it is alternatively contemplated that the angle can include a range between zero degrees and 45 degrees. At installation, the coned washer 174 can generate a preload at against the first surface 144 and the flange 194 to pull the shoulder against the second surface 146 of the casing 140. The preload can define a bias for the compliant interface 170 that can provide for movement and thermal growth at the coned washer 174. The thickness T and the angle 206 can be tailored to provide a predetermined preload force at the compliant interface 170. The greater the cone angle 206, the greater the force for the preload. Such a predetermined preload force can be determined based upon anticipated thermal growth or movement forces particular to the engine. Additionally, other factors can be included in determining the preload at the coned washer 174, such as the particular materials of the coned washer 174.

The compliant structure provides for thermal growth, while decreasing fatigue stresses at the attachment. Furthermore, the simplicity of attachment facilitates maintenance or replacement of the assembly, and does not require replacement of the entire support structure. Furthermore, the compliant interface provides a fluidic seal at the junction between the casing and the bypass air conduit while simultaneously preloading the connection to provide for the thermal growth and movement during operation.

A method of forming a compliant connection between a bypass air conduit and a casing of a turbine engine can include fastening a portion of the bypass air conduit to the casing with a biasing device to form a preload between the bypass air conduit and the casing. Fastening a portion of the bypass air conduit to the casing can include coupling the nut 172 to the bypass air conduit 102, which can be the inlet assembly 110 as described herein. Such fastening, for example, can be threadably fastening the nut 172 to the inlet assembly 110. The coned washer 174 can be the biasing device, or example. Fastening the biasing device as the coned washer 174 can form the preload between the bypass air conduit 102 and the casing 140.

The method of fastening a portion of the bypass air conduit to the casing with a biasing device can further include securing the coned washer 174 with the nut 172 between the bypass air conduit 102 and the casing 140 as described herein. The method can further include where the inducer assembly 90 as described herein can be the casing 140 and the method can include securing the bypass air conduit 102 to the inducer assembly 90.

It should be understood that the bypass air conduit 102, the compliant interface 170, and inducer assembly 90 or any other associated parts or elements can be made with additive manufacturing, such as direct metal laser melting (DMLM) or 3D printing to construct the precise elements as described. Such manufacturing can be used to develop the intricate details of the aforementioned, without the poor yields of such manufacturing as casting, or the imperfections associated with other manufacturing methods.

It should be appreciated that portions of the bypass air conduit 102 and the compliant interface 170 can be made by additive manufacturing, while any manufacturing process is contemplated. As such, the combined bypass air conduit 102 and the compliant interface 170 can include a plurality of individual modular elements. The modular nature of the assemblies described herein facilitates maintenance and servicing. Additionally, the aspects as described herein permit modulation or retrofitting among different engines. Furthermore, the modular assembly can provide for local tailoring of the preload at the joint suited to local environments, such as increased fatigue or operational temperatures.

It should be further appreciated that the bypass air conduit and compliant interface can be used to retrofit current engines to replace current bypass air conduit mounts.

It should be appreciated that application of the disclosed design is not limited to turbine engines with fan and booster sections, but is applicable to turbojets and turbo engines as well.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine comprising:
   an engine core having a casing containing a compressor section, a combustor section, and a turbine section in axial flow arrangement;
   a bypass air conduit extending at least partially between the compressor section and the turbine section; and
   a compliant interface comprising a nut securing the bypass air conduit to the casing and a biasing device comprising a coned washer disposed between the nut and the casing to define a first space between the nut and the casing;
   wherein the casing comprises an opening and the bypass air conduit passes through the opening;
   wherein the bypass air conduit comprises a shoulder located on a second side of the casing and the coned washer is located on a first side of the casing opposite the second side; and
   wherein the nut comprises a collar that extends through the opening and abuts the shoulder when the nut is secured.

2. The turbine engine of claim 1 further comprising an inducer located between the combustor section and the turbine section, with the inducer forming a portion of the casing and the bypass air conduit fluidly couples to the inducer.

3. The turbine engine of claim 1 wherein the nut comprises a flange that overlies the first side of the casing and the coned washer is located between the flange and the first side of the casing.

4. The turbine engine of claim 1 wherein the bypass air conduit includes an end with an elbow passing through the opening.

5. The turbine engine of claim 4 wherein the bypass air conduit further comprises a neck near the end.

6. The turbine engine of claim 5 wherein the bypass air conduit further comprises a rib provided in an interior of the bypass air conduit at the elbow to induce a vortical flow on an airflow passing through the bypass air conduit.

7. The turbine engine of claim 6 wherein the nut and the coned washer are positioned about the neck.

8. The turbine engine of claim 7 wherein the nut and the coned washer define a fluid seal between the bypass air conduit and the casing.

9. The turbine engine of claim 1 wherein the bypass air conduit is an inlet assembly for an inducer.

10. The turbine engine of claim 1 wherein a cone shape of the coned washer defines a second space between the casing and the coned washer.

11. A bypass air circuit fluidly coupling a compressor section to a turbine section and bypassing a combustor section of a turbine engine having a casing, the bypass aft circuit comprising:
   a bypass air conduit at least partially forming the bypass air circuit and extending between the compressor section and the turbine section; and
   a compliant interface including a nut securing the bypass air conduit to the casing and a biasing device comprising a coned washer disposed between the nut and the casing to define a first space between the nut and the casing;
   wherein the bypass air conduit comprises a shoulder located on a second side of the casing and the coned washer is located on a first side of the casing opposite the second side; and
   wherein the nut comprises a collar that extends through an opening in the casing and abuts the shoulder when the nut is secured.

12. The bypass air circuit of claim 11 further comprising an inducer located between the combustor section and the turbine section, with the inducer forming a portion of the casing and the bypass air conduit fluidly couples to the inducer.

13. The bypass air circuit of claim 11 wherein the nut comprises a flange that overlies the first side of the casing and the coned washer is located between the flange and the first side of the casing.

14. The bypass air circuit of claim 11 wherein a cone shape of the coned washer defines a second space between the casing and the coned washer.

* * * * *